United States Patent
Kim et al.

(10) Patent No.: US 9,303,915 B2
(45) Date of Patent: Apr. 5, 2016

(54) REFRIGERATOR AND METHOD OF MANUFACTURING DOOR THEREOF

(71) Applicant: Samsung Electronics Co., Ltd., Suwon-si (KR)

(72) Inventors: Joong Ho Kim, Kwangju (KR); Jong Hoon Oh, Gwangju (KR); Youn Tae Shin, Gwangju (KR); Young Bae Hong, Gwangju (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 293 days.

(21) Appl. No.: 13/872,353

(22) Filed: Apr. 29, 2013

(65) Prior Publication Data

US 2013/0293080 A1    Nov. 7, 2013

(30) Foreign Application Priority Data

May 2, 2012    (KR) .......................... 10-2012-0046083

(51) Int. Cl.
   *F25D 23/02*   (2006.01)
   *B23P 15/26*   (2006.01)
   *F25D 23/00*   (2006.01)

(52) U.S. Cl.
   CPC ............... *F25D 23/028* (2013.01); *B23P 15/26* (2013.01); *F25D 23/00* (2013.01); *F25D 23/02* (2013.01); *F25D 2201/14* (2013.01); *Y10T 29/49359* (2015.01)

(58) Field of Classification Search
   CPC .... F25D 23/02; F25D 23/028; F25D 2223/02
   USPC .................................................. 312/405, 402
   See application file for complete search history.

(56) References Cited

U.S. PATENT DOCUMENTS

| | | | | |
|---|---|---|---|---|
| 4,583,796 | A | * | 4/1986 | Nakajima et al. ............. 312/405 |
| 4,787,133 | A | * | 11/1988 | Lesmeister et al. ............. 29/460 |
| 6,164,030 | A | * | 12/2000 | Dietrich ....................... 52/406.2 |
| 7,316,125 | B2 | * | 1/2008 | Uekado et al. ................. 62/440 |
| 2011/0089790 | A1 | * | 4/2011 | Lee et al. ...................... 312/109 |
| 2011/0095669 | A1 | * | 4/2011 | Moon et al. ................... 312/405 |
| 2013/0328472 | A1 | * | 12/2013 | Shim et al. .................... 312/405 |
| 2015/0145399 | A1 | * | 5/2015 | Joo et al. ....................... 312/404 |

FOREIGN PATENT DOCUMENTS

| | | |
|---|---|---|
| JP | 2004-125394 | 4/2004 |
| JP | 2009-236183 | 10/2009 |
| KR | 10-2011-0034532 | 4/2011 |

* cited by examiner

*Primary Examiner* — Daniel Rohrhoff
(74) *Attorney, Agent, or Firm* — Staas & Halsey LLP

(57) ABSTRACT

Disclosed herein is a door of a refrigerator in which a vacuum insulation is positioned in the inner core of the door to be spaced apart from the top face, bottom face, front face, rear face and both lateral faces of the door, and a foam insulation is uniformly disposed in the remaining space in the door.

8 Claims, 10 Drawing Sheets

REFRIGERATOR AND METHOD OF MANUFACTURING DOOR THEREOF

CROSS-REFERENCE TO RELATED APPLICATIONS

This application claims the benefit of Korean Patent Application No. 10-2012-0046083, filed on May 2, 2012 in the Korean Intellectual Property Office, the disclosure of which is incorporated herein by reference.

BACKGROUND

1. Field

Embodiments relate to a door to open and close a storage compartment of a refrigerator.

2. Description of the Related Art

A refrigerator, which generally includes a storage compartment to store food and a cold air supply unit to supply cold air, is a home appliance used to keep food fresh.

The front face of the storage compartment, which is formed to be opened to take out or store food, may be opened or closed by a door. The door includes a heat insulator to prevent leakage of cold air in the storage compartment or introduction of warmer external air into the storage compartment.

For the door of the refrigerator, foam insulation, which is formed by foaming and hardening an undiluted urethane foam solution made by mixing foaming agent and urethane, and vacuum insulation, which is formed by coating an inner core member formed of glass fiber with an aluminum deposited film, are mainly used.

Since the vacuum insulation has a better insulation performance than the foam insulation, it may be useful in achieving a predetermined insulation performance and at the same time minimizing the thickness of the door. Therefore, the foam insulation and the vacuum insulation are sometimes used together for the doors of recent refrigerators.

However, if the vacuum insulation is arranged to contact the outer panel or inner panel of the door, frost may be formed on the outer panel or inner panel of the door due to heat transfer of external warm air to the door. For this reason, the vacuum insulation is disposed at the core of the door so as not to contact the outer panel or inner panel, and sometimes the foam insulation is disposed between the outer panel and the vacuum insulation and between the vacuum insulation and the inner panel.

An example of such a refrigerator is disclosed in Korean Patent Application Publication No. 10-2011-0034532. According to this document, vacuum insulation is arranged inclined using a support member placed between the outer panel and the inner panel, and then urethane foam solution is injected into the space between the vacuum insulation and the outer panel and the space between the vacuum insulation and the inner panel at the same time and foamed and hardened.

However, with the above technique, it may be difficult to obtain uniform formation of foam insulation between the vacuum insulation and the outer panel and between the vacuum insulation and the inner panel.

SUMMARY

In an aspect of one or more embodiments, there is provided a structure of a refrigerator door having vacuum insulation and foam insulation, the vacuum insulation positioned in the core of the door and the foam insulation being uniformly formed between the vacuum insulation and the outer panel and between the vacuum insulation and the inner panel, and a manufacturing method thereof.

In an aspect of one or more embodiments, there is provided a refrigerator which includes a body, a storage compartment arranged in the body such that a front face thereof is open, and a door to open and close the open front face of the storage compartment, wherein the door includes an outer panel forming a front face and both lateral faces of the door, an inner panel forming a rear face of the door, an upper cap forming a top face of the door, a lower cap forming a bottom face of the door, an inner space defined by the outer panel, the inner panel, the upper cap and the lower cap, a vacuum insulation assembly disposed in a part of the inner space, the vacuum insulation assembly including a vacuum insulation spaced apart from the front face, both lateral faces, top face and bottom face of the door, and a first foam insulation provided with a mount portion allowing the vacuum insulation to be mounted thereto, and a second foam insulation disposed in a remaining part of the inner space.

Here, the first foam insulation may be formed by foaming and hardening an undiluted urethane foam solution in a first foam insulation forming mold, and the second foam insulation may be formed by foaming and hardening the urethane foam solution in the remaining part of the inner space.

The outer panel, the inner panel, the upper cap, the lower cap, the first foam insulation and the vacuum insulation may be fixed to each other by adhesiveness of the second foam insulation.

The first foam insulation may be fitted between the upper cap and the lower cap to be temporarily fixed such that the first foam insulation is prevented from being shaken due to foaming pressure generated when the second foam insulation is being disposed in a remaining part of the inner space by foaming.

The first foam insulation may be temporarily fixed to the outer panel by an adhesive member such that the first foam insulation is prevented from being shaken due to foaming pressure generated when the second foam insulation is being disposed in a remaining part of the inner space by foaming by foaming.

The first foam insulation may include at least one accommodation portion to accommodate a part of the second foam insulation to strengthen coupling of the first foam insulation to the second foam insulation.

The vacuum insulation may be fitted into the mount portion to be temporarily fixed to the first foam insulation.

The vacuum insulation may be temporarily fixed to the first foam insulation by an adhesive member.

The door may be arranged laterally symmetrical with respect to a median plane dividing the door into left and right parts.

In an aspect of one or more embodiments, there is provided a refrigerator which includes a body, a storage compartment arranged in the body such that a front face thereof is open, and a door to open and close the open front face of the storage compartment, wherein the door includes an outer panel forming a front face of the door, an inner panel forming a rear face of the door, a vacuum insulation disposed between the outer panel and the inner panel, a first foam insulation disposed between the outer panel and the vacuum insulation, and a second foam insulation disposed between the vacuum insulation and the inner panel, wherein the first foam insulation is formed by foaming and hardening an undiluted urethane foam solution in a first foam insulation forming mold, and the second foam insulation is formed by foaming and hardening the urethane foam solution in a space defined between the vacuum insulation and the inner panel.

The first foam insulation may include a mount portion allowing the vacuum insulation to be mounted thereto.

In an aspect of one or more embodiments, there is provided a refrigerator which includes a body, a storage compartment arranged in the body such that a front face thereof is open, and a door to open and close the open front face of the storage compartment, wherein the door includes an outer panel forming a front face and both lateral faces of the door, an inner panel forming a rear face of the door, an upper cap forming a top face of the door, a lower cap forming a bottom face of the door, a vacuum insulation arranged spaced apart from the front face, both lateral faces, top face and bottom face of the door, a first foam insulation disposed between the front face of the door and the vacuum insulation such that the front face of the door and the vacuum insulation are spaced apart from each other, and a second foam insulation to couple the outer panel, the inner panel, the upper cap, the lower cap, the vacuum insulation and the first foam insulation to each other.

In an aspect of one or more embodiments, there is provided a method of manufacturing a door of a refrigerator includes preparing an outer panel forming a front face and both lateral faces of the door, an inner panel forming a rear face of the door, an upper cap forming a top face of the door, a lower cap forming a bottom face of the door, and a vacuum insulation, forming a first foam insulation by foaming and hardening an undiluted urethane foam solution in a foam insulation forming mold, coupling the outer panel, the inner panel, the upper cap, the lower cap, the first foam insulation and the vacuum insulation to each other such that the vacuum insulation is spaced apart from the front face, both lateral faces, top face and bottom face of the door, and forming a second foam insulation by foaming and hardening the urethane foam solution in an inner space defined by the outer panel, the inner panel, the upper cap and the lower cap.

Here, the coupling may include fitting the first foam insulation between the upper cap and the lower cap to temporarily fix the first foam insulation such that the first foam insulation is prevented from being shaken due to pressure generated in the operation of forming the second foam insulation by foaming.

The coupling may include temporarily fixing the first foam insulation to the outer panel with an adhesive member such that the first foam insulation is prevented from being shaken due to pressure generated in the operation of forming the second foam insulation by foaming.

The first foam insulation may include a mount portion allowing the vacuum insulation to be mounted thereto, wherein the coupling may include fitting the vacuum insulation into the mount portion to temporarily fix the vacuum insulation to the first foam insulation such that the vacuum insulation is prevented from being shaken due to pressure generated in the operation of forming the second foam insulation by foaming.

The first foam insulation may include a mount portion allowing the vacuum insulation to be mounted thereto, wherein the coupling may include temporarily fixing the vacuum insulation to the first foam insulation with an adhesive member such that the vacuum insulation is prevented from being shaken due to pressure generated in the operation of forming the second foam insulation by foaming.

In an aspect of one or more embodiments, there is provided a method of manufacturing a door of a refrigerator including an outer panel, an inner panel, a vacuum insulation disposed between the outer panel and the inner panel, a first foam insulation disposed between the outer panel and the vacuum insulation, and a second foam insulation disposed between the vacuum insulation and the inner panel, the method includes forming a first foam insulation by foaming and hardening an undiluted urethane foam solution in a first foam insulation forming mold, coupling the outer panel, the first foam insulation, the vacuum insulation and the inner panel to each other, and forming the second foam insulation by foaming and hardening the urethane foam solution in a space defined between the vacuum insulation and the inner panel.

In an aspect of one or more embodiments, there is provided a refrigerator which includes a body coupled to a door, wherein in the door includes an outer panel forming a front face and both lateral faces of the door, an inner panel forming a rear face of the door, an upper cap forming a top face of the door, a lower cap forming a bottom face of the door, a vacuum insulation arranged spaced apart from the front face, both lateral faces, top face and bottom face of the door, a first foam insulation disposed between the front face of the door and the vacuum insulation such that the front face of the door and the vacuum insulation are spaced apart from each other, and a second foam insulation to couple the outer panel, the inner panel, the upper cap, the lower cap, the vacuum insulation and the first foam insulation to each other.

Here, the first foam insulation may include a mount portion allowing the vacuum insulation to be mounted thereto.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
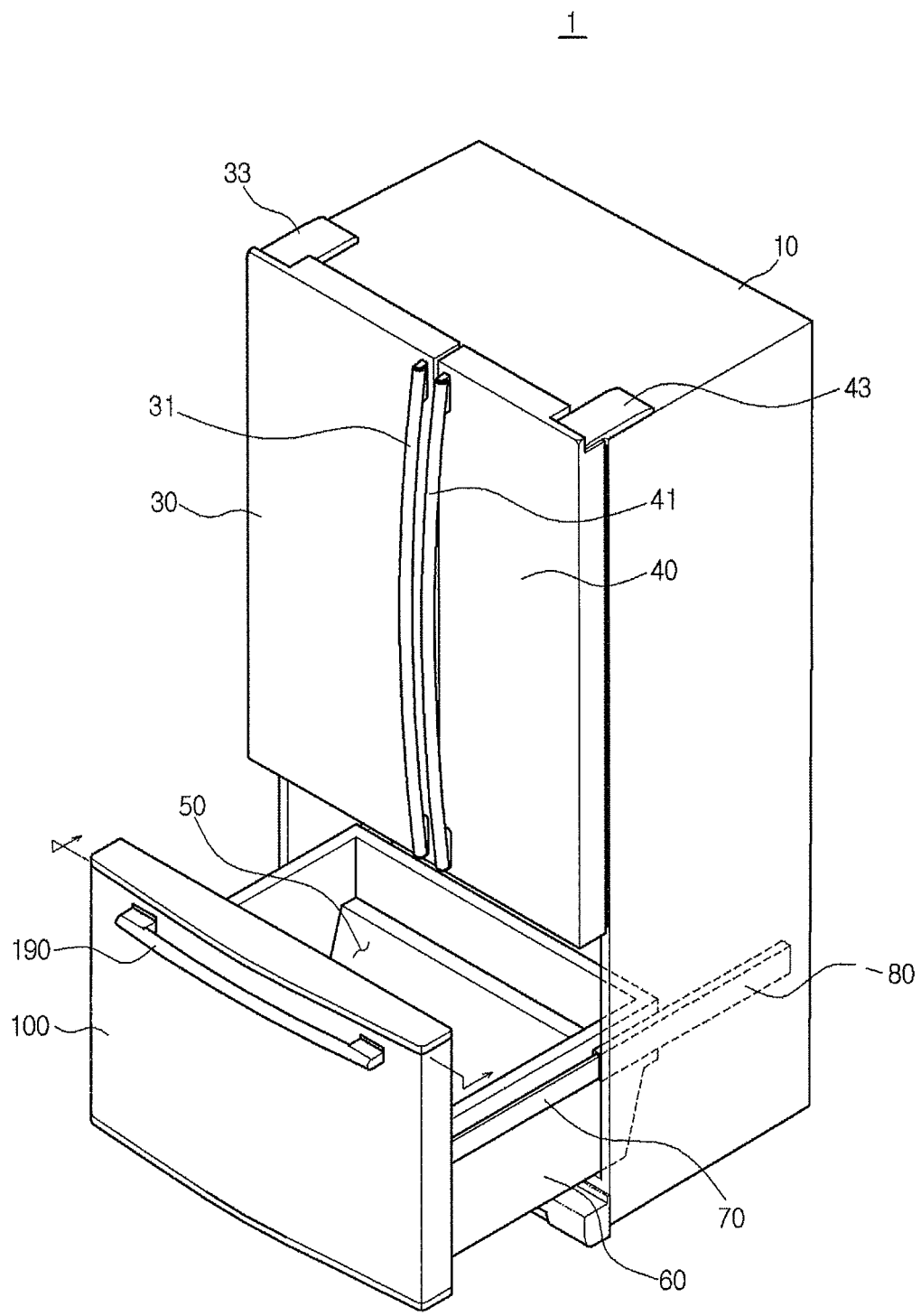
FIG. 1 is a perspective view showing an external appearance of a refrigerator according to an exemplary embodiment.

Reference will now be made in detail to embodiments, examples of which are illustrated in the accompanying drawings, wherein like reference numerals refer to like elements throughout.

Figure 2:
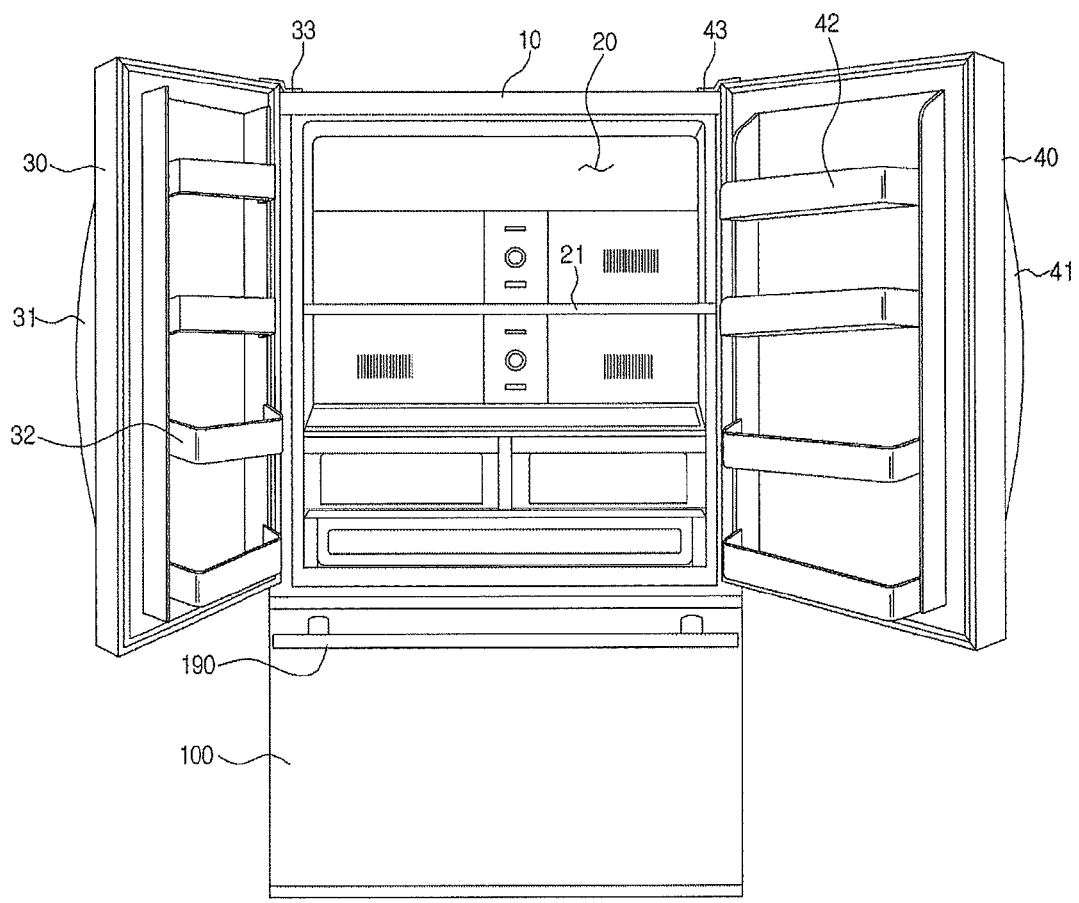
FIG. 2 is a view illustrating the inside of the refrigerator of FIG. 1.

FIG. 1 is a perspective view showing an external appearance of a refrigerator according to an exemplary embodiment and FIG. 2 is a view illustrating the inside of the refrigerator of FIG. 1.

Referring to FIGS. 1 and 2, the refrigerator 1 includes a body 10, storage compartments 20 and 50 formed inside the body 10, and a cold air supply unit to supply cold air to the storage compartments 20 and 50.

The body 10 may include an inner case to define the storage compartments 20 and 50, an outer case coupled to the outside of the inner case, a thermal insulation disposed between the inner case and the outer case to insulate the storage compartments 20 and 50. The cold air supply unit may include a compressor (not shown) to compress a refrigerant, a condenser (not shown) to condense the refrigerant, a capillary tube (not shown) to expand the refrigerant, and an evaporator (not shown) to evaporate the refrigerant to produce cold air.

The storage compartments 20 and 50 may be divided into an upper refrigeration compartment 20 and a lower freezer compartment 50 by an intermediate partition. The temperature of the refrigeration compartment 20 may be maintained at about 3° C., while the temperature of the freezer compartment 50 may be maintained at about −18° C.

The refrigeration compartment 20 has an open front face to receive food therethrough, and the open front face may be opened and closed by a pair of swiveling doors 30 and 40 rotatably coupled to the hinge members 33 and 43. A shelf 21 allowing food to be placed thereon may be provided in the refrigeration compartment 20.

The front faces of the doors 30 and 40 may be provided with door handles 31 and 41 to be gripped to open and close the doors 30 and 40, and the rear faces of the doors 30 and 40 may be provided with door guides 32 and 42 allowing food to be placed thereon.

The freezer compartment 50 has an open front face to receive food therethrough, and the open front face may be opened and closed by a door 100 adapted to slidably move back and forth. A storage box 60 is provided at the rear face of the door 100.

Movable rail members 70 may be combined to the door 100 and the storage box 60, and may be slidably supported by fixed rail members 80 formed on the body 10. Accordingly, the door 100 and the storage box 60 are allowed to slide with respect to the body 10. A door handle 190 to be gripped to open and close the door 100 is provided on the front face of the door 100.

Thermal insulation is arranged inside the doors 30, 40 and 100 to prevent leakage of cold air in the storage compartments 20 and 50 and introduction of external warm air into the storage compartments 20 and 50. Particularly, the freezer compartment door 100 of the freezer compartment 50 which is maintained at a lower temperature than refrigeration compartment 20 needs to have a higher insulation performance than the refrigeration compartment doors 30 and 40.

Hereinafter, a structure of the freezer compartment door 100 including vacuum insulation to secure a predetermined insulation performance and minimize the thickness of the door will be described in detail. The structure of the door in the illustrated embodiment may be applied not only to the freezer compartment door 100, but also to the refrigeration compartment doors 30 and 40.

Figure 3:
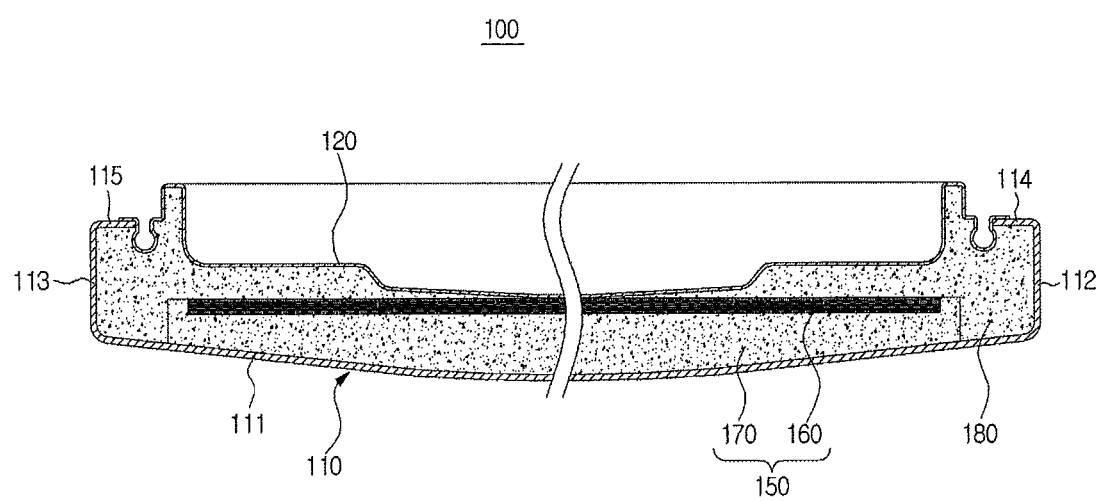
FIG. 3 is a cross-sectional view illustrating the structure of the door of the refrigerator in FIG. 1.
Figure 4:
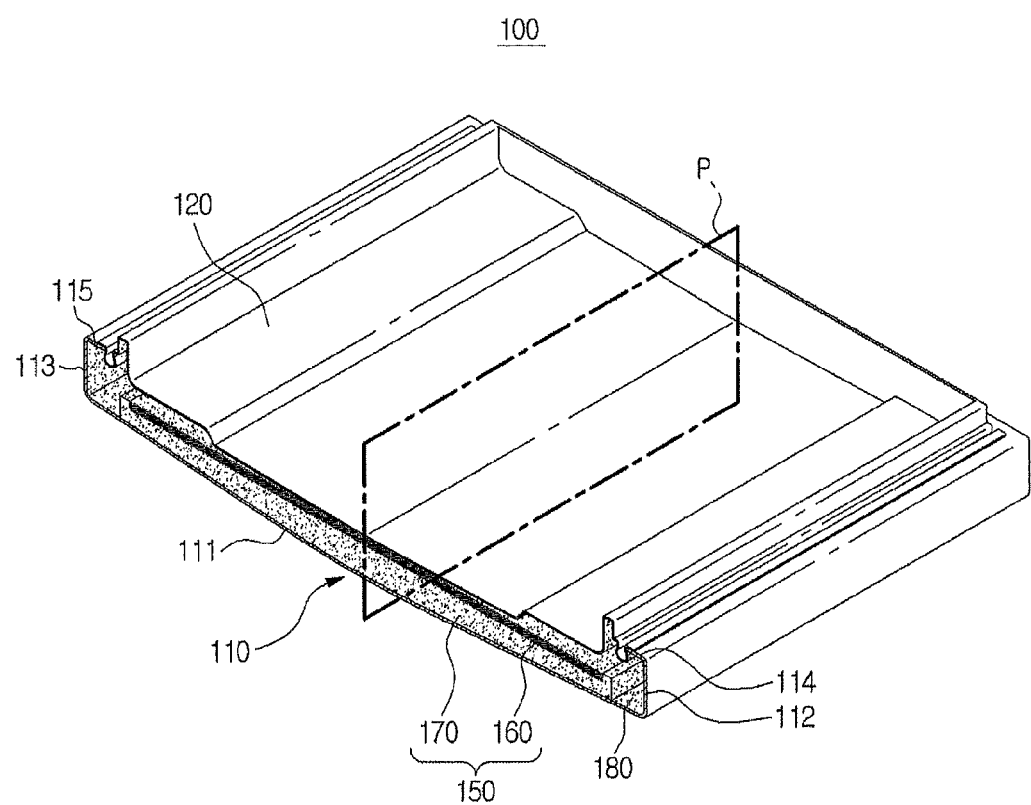
FIG. 4 is a partial cutaway perspective view illustrating the structure of the door of the refrigerator in FIG. 1.
Figure 5:
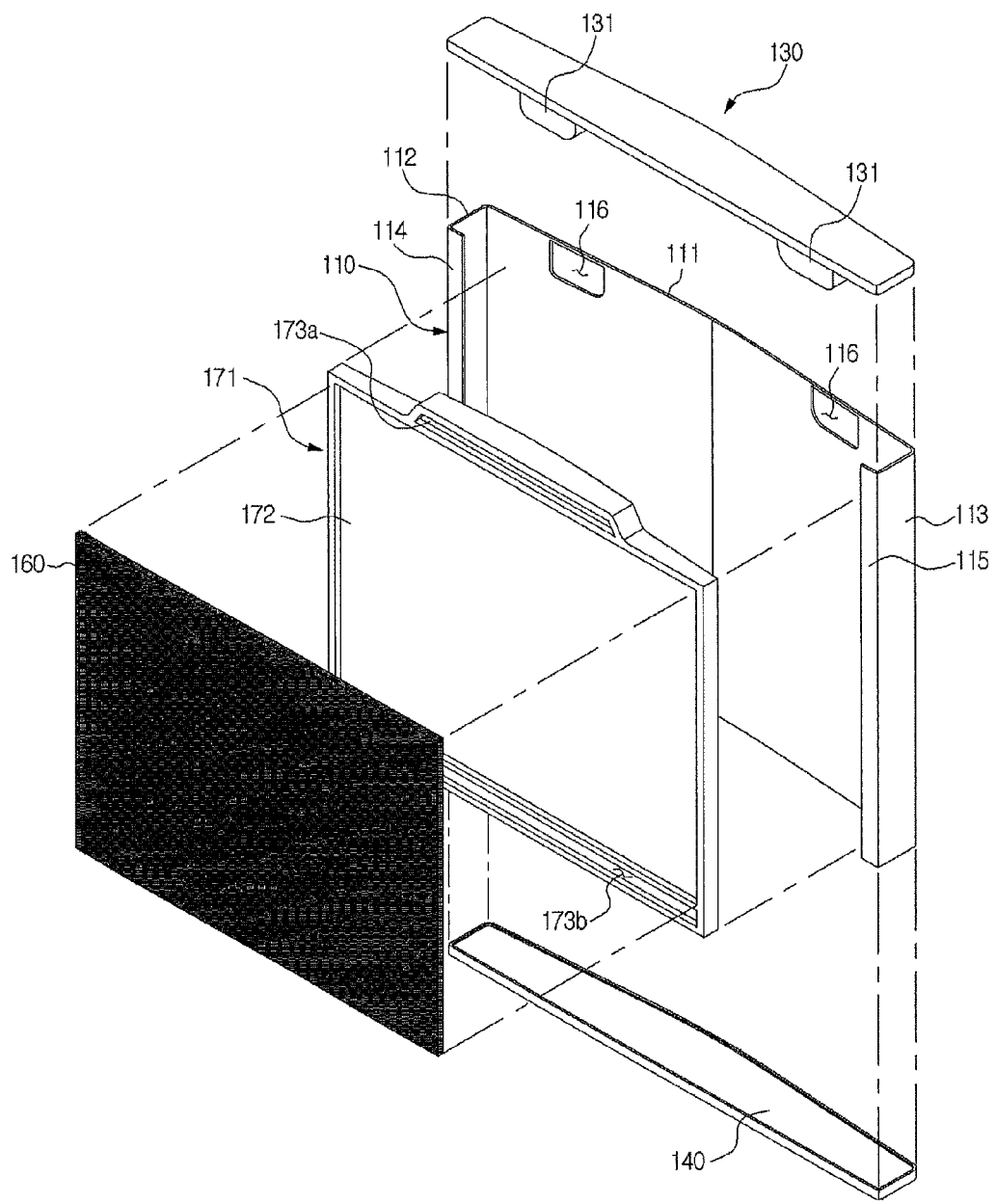
FIG. 5 is an exploded perspective view illustrating the structure of the door of the refrigerator in FIG. 1 which is not yet provided with the second foam insulation by foaming.
Figure 6:
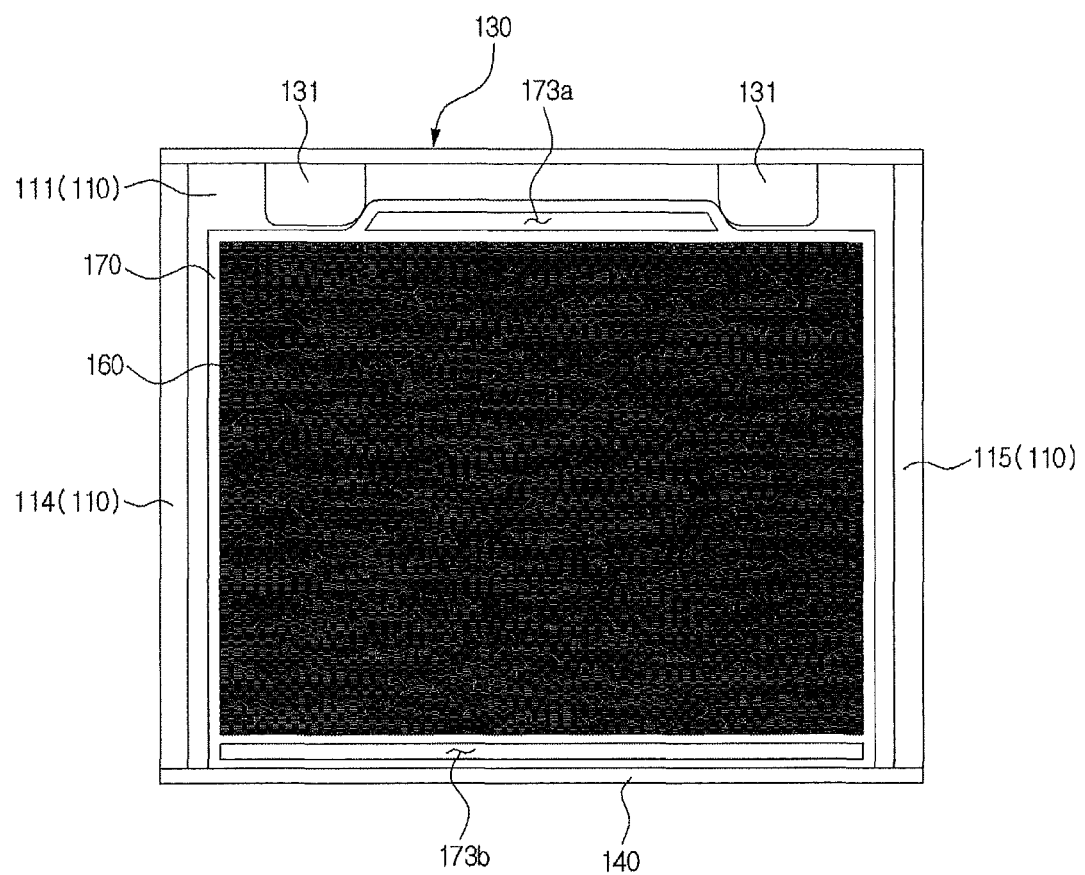
FIG. 6 is a view illustrating the structure of the door of the refrigerator in FIG. 1 which is not yet provided with the second foam insulation by foaming.
Figure 7:
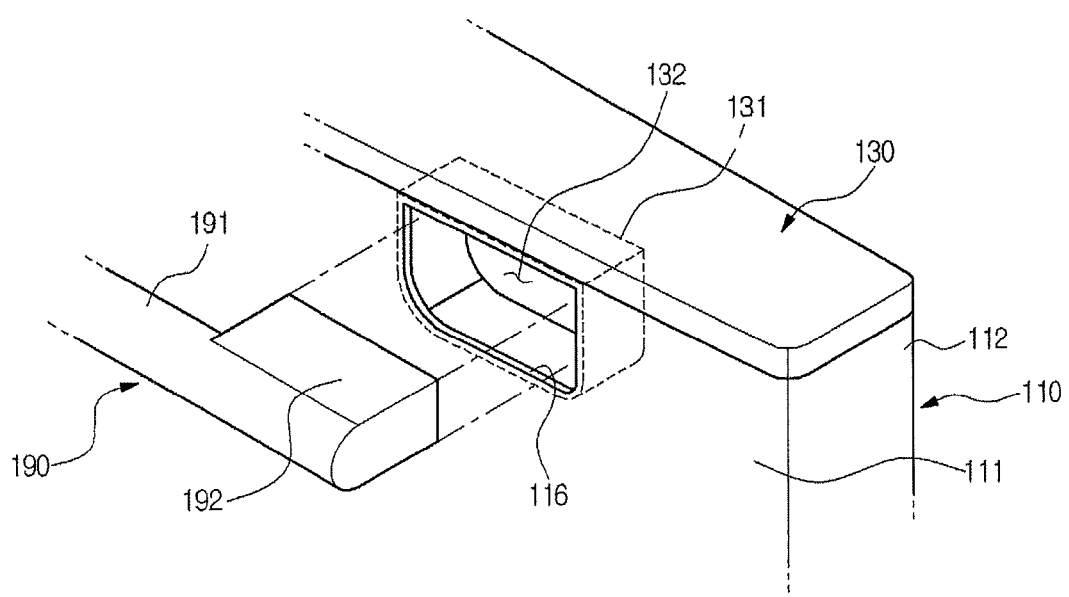
FIG. 7 is a view illustrating coupling a door handle to the door of the refrigerator in FIG. 1.
Figure 8:
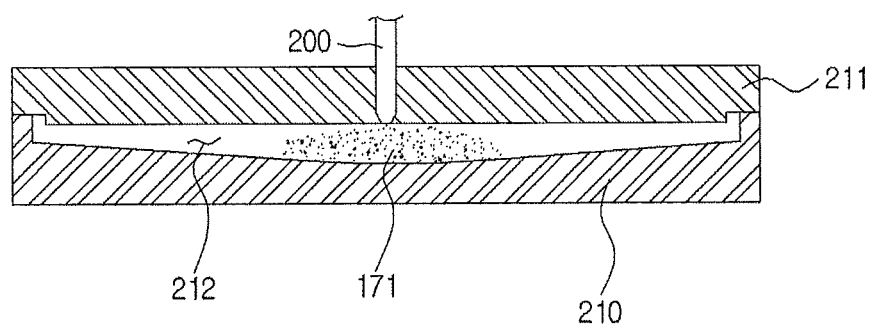
FIG. 8 is a view illustrating formation of a first foam insulation in the door of the refrigerator in FIG. 1.
Figure 9:
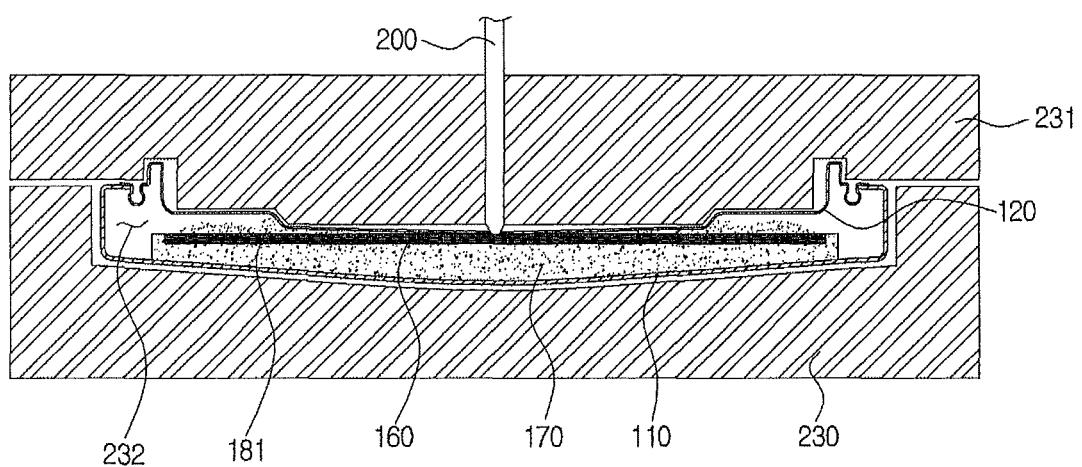
FIG. 9 is a view illustrating formation of a second foam insulation in the door of the refrigerator in FIG. 1.

FIG. 3 is a cross-sectional view illustrating the structure of the door of the refrigerator in FIG. 1, FIG. 4 is a partial cutaway perspective view illustrating the structure of the door of the refrigerator in FIG. 1, FIG. 5 is an exploded perspective view illustrating the structure of the door of the refrigerator in FIG. 1 which is not yet provided with the second foam insulation by foaming, FIG. 6 is a view illustrating the structure of the door of the refrigerator in FIG. 1 which is not yet provided with the second foam insulation by foaming, FIG. 7 is a view illustrating coupling of a door handle to the door of the refrigerator in FIG. 1, FIG. 8 is a view illustrating formation of a first foam insulation in the door of the refrigerator in FIG. 1, and FIG. 9 is a view illustrating formation of a second foam insulation in the door of the refrigerator in FIG. 1.

Referring to FIGS. 3 to 7, the door 100 according to the illustrated embodiment includes an outer panel 110, an inner panel 120, an upper cap 130 and a lower cap 140. The outer panel 110, inner panel 120, upper cap 130 and lower cap 140 are coupled to each other, defining an inner space.

The inner space may be a closed space. Arranged in the inner space are a vacuum insulation 160, a first foam insulation 170 and a second foam insulation 180.

The outer panel 110 includes a front portion 111 forming the front face of the door 100, lateral portions 112 and 113 forming both lateral sides of the door 100, and coupling portions 114 and 115 coupled to the inner panel 120. The outer panel 110 may be formed of a metallic material to have proper rigidity and aesthetics. The outer panel 110 may be formed in various processes such as injection molding and roll forming.

The inner panel 120 is coupled to the rear surface of the outer panel 110 to form the rear face of the door 100. The inner panel 120 may be formed for a resin material in vacuum molding.

The upper cap 130 is coupled to the upper ends of the outer panel 110 and the inner panel 120, and the lower cap 140 is coupled to the lower ends of the outer panel 110 and the inner panel 120. The upper cap 130 forms the top face of the door 100, while the lower cap 140 forms the bottom face of the door 100. The upper cap 130 and the lower cap 140 may be formed a resin material through a process such as injection molding.

As shown in FIGS. 5 and 7, the upper cap 130 may be provided with an accommodation portion 131 to which the door handle 190 is coupled. The accommodation portion 131 may be arranged to protrude from the front side of the door 100 to the rear side thereof, and an accommodation space 132 (FIG. 7) to accommodate the coupling portion 192 of the door handle 190 may be formed in the accommodation portion 131.

Here, the door handle 190 may include a grip 191 to be gripped by a hand, and the coupling portion 192 adapted to couple the door handle 190 to the door 100. A plurality of coupling portions 192 may be formed on both sides of the grip 191.

The door handle 190 may be fitted into the door 100 by inserting the coupling portion 192 into the accommodation space 132. To strengthen coupling between the door handle 190 and the door 100, the coupling portion 192 and the accommodation portion 131 may be fastened by a separate fastening member not shown in FIGS. 5 and 7.

The outer panel 110 may be provided with an opening 116 allowing the coupling portion 192 of the door handle 190 to be accommodated in the accommodation space 132 of the upper cap 130 therethrough.

The first foam insulation 170 may be formed by foaming and hardening the undiluted urethane foam solution 171. In this operation, the first foam insulation 170 may be formed, as shown in FIG. 8, by foaming and hardening a urethane foam solution 171 in a first foam insulation forming mold 210 and 211.

The first foam insulation forming mold 210 and 211 may include a first mold 210 and a second mold 211. The first mold 210 and the second mold 211 may define a molding space 212 therebetween.

When the urethane foam solution 171 is injected into the molding space 212 through the header 200, the urethane foam solution 171 may be foamed and hardened in the molding space 212 to form the first foam insulation 170. After foaming and hardening of the first urethane foam solution 171 is completed, the first mold 210 and the second mold 211 may be separated from each other to remove the first foam insulation 170.

The first foam insulation 170 formed as above may have, as shown in FIG. 5, a mount portion 172 to which the vacuum insulation 160 is mounted. The mount portion 172 may have a groove shape to accommodate the vacuum insulation 160. Here, the vacuum insulation 160 may be formed by coating an inner core member formed of glass fiber such as glass wool with an aluminum deposited multilayer film. The vacuum insulation 160 is generally known to have better insulation performance than the foam insulation 170.

The vacuum insulation 160 may be fitted into the mount portion 172 to be temporarily fixed to the first foam insulation 170. Here, temporarily fixing the vacuum insulation 160 indicates that the vacuum insulation 160 may be separated from the mount portion 172 by applying force over a predetermined level to the vacuum insulation 160, which in turn indicates that constituents of the door 100 are temporarily fixed before the second foam insulation 180 is foamed in the door 100 such that the constituents of the door 100 are firmly fixed to each other by adhesiveness of the second foam insulation 180, as will be described later. By temporarily fixing the constituents as above, the constituents may be prevented from being shaken or displaced by foaming pressure during formation of the second foam insulation 180.

Alternatively, the vacuum insulation 160 may be temporarily fixed to the first foam insulation 170 through an adhesive member such as a double-sided adhesive tape.

Also, the first foam insulation 170 may have accommodation portions 173a and 173b to accommodate a part of the second foam insulation 180 such that coupling of the first foam insulation 170 to the second foam insulation 180 is strengthened. A plurality of accommodation portions 173a and 173b may be provided at proper positions.

The first foam insulation 170 may be fitted between the upper cap 130 and the lower cap 140 to be temporarily fixed, as shown in FIG. 6. In the illustrated embodiment, the first foam insulation 170 is adapted to contact the accommodation portion 131 of the upper cap 130. However, embodiments are not limited thereto. The first foam insulation 170 may contact other structural constituents of the upper cap 130. Alternatively, the first foam insulation 170 may be temporarily fixed to the outer panel 110 through an adhesive member such as a double-sided adhesive tape.

The sides of the first foam insulation 170 and the door 100 facing each other may be arranged spaced apart from each other, and the space therebetween may be provided with the second foam insulation 180 by foaming.

The first foam insulation 170 and the vacuum insulation 160 may be coupled to each other to form a vacuum insulation assembly 150. In fabricating the door 100, the first foam insulation 170 may be first coupled to the rear surface of the outer panel 110, and then the vacuum insulation 160 may be mounted to the mount portion 172 of the first foam insulation 170. Otherwise, the vacuum insulation 160 may be first mounted to the mount portion 172 of the first foam insulation 170, and then the first foam insulation 170 may be coupled to the rear surface of the outer panel 110.

In this case, mounting of the vacuum insulation 160 to the mount portion 172 of the first foam insulation 170 allows the vacuum insulation 160 to be spaced apart from the front face, lateral faces, top face and bottom face of the door 100.

As such, foaming for the second foam insulation is allowed to be implemented in the inner space of the door 100 after the outer panel 110, first foam insulation 170, vacuum insulation 160, inner panel 120, upper cap 130 and lower cap 140 are coupled to each other.

As shown in FIG. 9, after the outer panel 110, first foam insulation 170, vacuum insulation 160, upper cap 130, lower cap 140 and inner panel 120 are coupled, the second urethane foam solution 181 may be injected into the inner space 232 of the door 100 through the header 200 and then foamed and hardened.

At this time, the outer panel 110, upper cap 130, lower cap 140 and inner panel 120 may be supported by jigs 230 and 231 to prevent the outer panel 110, upper cap 130, lower cap 140 and inner panel 120 from being separated from each other due to foaming pressure of the second urethane foam solution 181. The jigs 230 and 231 may include a first jig 230 to support the outer panel 110, and the second jig 231 to support the inner panel 120.

The second urethane foam solution 181 may be injected into the inner space 232 through the inner panel 120 as shown in FIG. 9, embodiments are not limited thereto. The second urethane foam solution 181 may be injected into the inner space 232 through an injection inlet (not shown) formed in the upper cap 130 or lower cap 140.

Since the constituents of the door 100 are temporarily fixed to each other, they may not be shaken or displaced by foaming pressure generated in foaming the second urethane foam solution 181.

When foaming and hardening of the second urethane foam solution 181 are completed, the outer panel 110, first foam insulation 170, vacuum insulation 160, upper cap 130, lower cap 140, inner panel 120 and second foam insulation 180 may be firmly fixed to each other by adhesiveness of the hardened the second urethane foam solution 181. After foaming and hardening of the second urethane foam solution 181 are completed, the first μg 230 and the second jig 231 may be separated from each other to remove the door 100.

Figure 10:
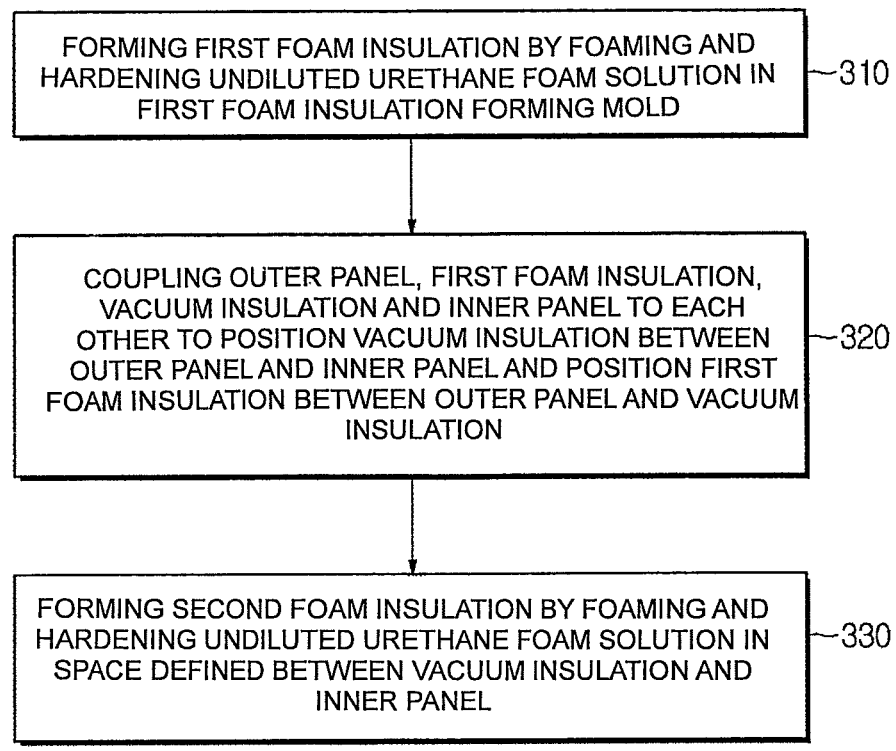
FIG. 10 is a flowchart illustrating the method of manufacturing the door of the refrigerator in FIG. 1.

FIG. 10 is a flowchart illustrating the method of manufacturing the door of the refrigerator in FIG. 1. The method of manufacturing the refrigerator door according to the illustrated embodiment will be briefly described with reference to FIGS. 1 to 10.

First, the urethane foam solution 171 is foamed and hardened in the first foam insulation forming molds 210 and 211 to form the first foam insulation 170 (310).

Next, the outer panel 110, the pre-fabricated first foam insulation 170, vacuum insulation 160, and inner panel 120 are coupled to each other. In this case, the upper cap 130 and the lower cap 140 may be coupled at the same time. Also, since the vacuum insulation 160 is mounted to the mount portion 172 formed at the first foam insulation 170, the vacuum insulation 160 may not contact the outer panel 110 (320).

Next, the urethane foam solution 181 is foamed and hardened in the space between the vacuum insulation 160 and the inner panel 120 to form the second foam insulation 180 (330).

Through the above operations, the first foam insulation 170 and the second foam insulation 180 may be uniformly formed and at the same time the vacuum insulation 160 may be positioned in the core of the door 100. Also, the door 100 may be arranged laterally symmetrical with respect to the median plane P (FIG. 4).

As is apparent from the above description, while the vacuum insulation is positioned in the core of the door such that the vacuum insulation is spaced apart from the front face, rear face, both lateral faces, upper face and lower face of the door, the foam insulation may be uniformly formed in the remaining space within the door.

Also, a first foam insulation to be disposed between the outer panel of the door and the vacuum insulation may be prepared in advance, foaming operation may be simplified as the outer panel of the door, the first foam insulation and the vacuum insulation are coupled to each other before the second foam insulation is foamed in the remaining space within the door.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A refrigerator comprising:
a body;
a storage compartment arranged in the body such that a front face thereof is open; and
a door to open and close the front face of the storage compartment,
wherein the door comprises:
an outer panel having a front face;
an inner panel forming a rear face of the door;
an upper cap forming a top face of the door;
a lower cap forming a bottom face of the door;
an inner space defined by the outer panel, the inner panel, the upper cap and the lower cap;
a vacuum insulation assembly disposed in a part of the inner space, the vacuum insulation assembly comprising a vacuum insulation spaced apart from the front face, top face and bottom face of the door, and a first foam insulation provided with a mount portion allowing the vacuum insulation to be mounted thereto; and
a second foam insulation disposed in a remaining part of the inner space,
wherein the first foam insulation comprises at least one accommodation portion to accommodate a part of the second foam insulation to strengthen coupling of the first foam insulation to the second foam insulation.

2. The refrigerator according to claim 1, wherein the vacuum insulation is fitted into the mount portion to be temporarily fixed to the first foam insulation.

3. A refrigerator comprising:
a body;
a storage compartment arranged in the body such that a front face thereof is open; and
a door to open and close the front face of the storage compartment,
wherein the door comprises:
an outer panel having a front face;
an inner panel forming a rear face of the door;
an upper cap forming a top face of the door;
a lower cap forming a bottom face of the door;
an inner space defined by the outer panel, the inner panel, the upper cap and the lower cap;
a vacuum insulation assembly disposed in a part of the inner space, the vacuum insulation assembly comprising a vacuum insulation spaced apart from the front face, top face and bottom face of the door, and a first foam insulation provided with a mount portion allowing the vacuum insulation to be mounted thereto; and
a second foam insulation disposed in a remaining part of the inner space,
wherein the first foam insulation is formed by foaming and hardening an undiluted urethane foam solution in a first foam insulation forming mold; and
wherein the second foam insulation is formed by foaming and hardening a urethane foam solution in the remaining part of the inner space.

4. A refrigerator comprising:
a body;
a storage compartment arranged in the body such that a front face thereof is open; and
a door to open and close the front face of the storage compartment,
wherein the door comprises:
an outer panel having a front face;
an inner panel forming a rear face of the door;
an upper cap forming a top face of the door;
a lower cap forming a bottom face of the door;
an inner space defined by the outer panel, the inner panel, the upper cap and the lower cap;
a vacuum insulation assembly disposed in a part of the inner space, the vacuum insulation assembly comprising a vacuum insulation spaced apart from the front face, top face and bottom face of the door, and a first foam insulation provided with a mount portion allowing the vacuum insulation to be mounted thereto; and
a second foam insulation disposed in a remaining part of the inner space, and
wherein the outer panel, the inner panel, the upper cap, the lower cap, the first foam insulation and the vacuum insulation are fixed to each other by adhesiveness of the second foam insulation.

5. A refrigerator comprising:
a body;
a storage compartment arranged in the body such that a front face thereof is open; and
a door to open and close the front face of the storage compartment,
wherein the door comprises:
an outer panel having a front face;
an inner panel forming a rear face of the door;
an upper cap forming a top face of the door;
a lower cap forming a bottom face of the door;
an inner space defined by the outer panel, the inner panel, the upper cap and the lower cap;
a vacuum insulation assembly disposed in a part of the inner space, the vacuum insulation assembly comprising a vacuum insulation spaced apart from the front face, top face and bottom face of the door, and a first foam insulation provided with a mount portion allowing the vacuum insulation to be mounted thereto; and
a second foam insulation disposed in a remaining part of the inner space, and
wherein the first foam insulation is fitted between the upper cap and the lower cap to be temporarily fixed such that the first foam insulation is prevented from being shaken due to foaming pressure generated when the second foam insulation is being disposed in the remaining part of the inner space by foaming.

6. A refrigerator comprising:
a body;
a storage compartment arranged in the body such that a front face thereof is open; and
a door to open and close the front face of the storage compartment,
wherein the door comprises:
an outer panel having a front face;
an inner panel forming a rear face of the door;
an upper cap forming a top face of the door;
a lower cap forming a bottom face of the door;

an inner space defined by the outer panel, the inner panel, the upper cap and the lower cap;

a vacuum insulation assembly disposed in a part of the inner space, the vacuum insulation assembly comprising a vacuum insulation spaced apart from the front face, top face and bottom face of the door, and a first foam insulation provided with a mount portion allowing the vacuum insulation to be mounted thereto; and a second foam insulation disposed in a remaining part of the inner space, and wherein the first foam insulation is temporarily fixed to the outer panel by an adhesive member such that the first foam insulation is prevented from being shaken due to foaming pressure generated when the second foam insulation is being disposed in the remaining part of the inner space by foaming.

7. A refrigerator comprising:

a body;

a storage compartment arranged in the body such that a front face thereof is open; and a door to open and close the front face of the storage compartment, wherein the door comprises:

an outer panel having a front face;

an inner panel forming a rear face of the door;

an upper cap forming a top face of the door;

a lower cap forming a bottom face of the door;

an inner space defined by the outer panel, the inner panel, the upper cap and the lower cap;

a vacuum insulation assembly disposed in a part of the inner space, the vacuum insulation assembly comprising a vacuum insulation spaced apart from the front face, top face and bottom face of the door, and a first foam insulation provided with a mount portion allowing the vacuum insulation to be mounted thereto; and a second foam insulation disposed in a remaining part of the inner space, and wherein the vacuum insulation is temporarily fixed to the first foam insulation by an adhesive member.

8. The refrigerator according to claim 7, wherein the door is arranged laterally symmetrical with respect to a median plane dividing the door into left and right parts.

\* \* \* \* \*